(12) United States Patent
Kashyn et al.

(10) Patent No.: US 11,907,734 B2
(45) Date of Patent: Feb. 20, 2024

(54) DYNAMIC LINKING OF CONTENT ELEMENTS TO DEVELOPMENT TOOL RESOURCES

(71) Applicant: salesforce.com, inc., San Francisco, CA (US)

(72) Inventors: Dmytro Kashyn, Holliston, MA (US); Sergii Puliaiev, Clayton, CA (US); Preethi Mali Mahalingam, San Carlos, CA (US); Vatsal A. Shah, Hayward, CA (US)

(73) Assignee: salesforce.com, inc., San Francisco, CA (US)

( * ) Notice: Subject to any disclaimer, the term of this patent is extended or adjusted under 35 U.S.C. 154(b) by 267 days.

(21) Appl. No.: 16/393,670

(22) Filed: Apr. 24, 2019

(65) Prior Publication Data

US 2020/0341777 A1 Oct. 29, 2020

(51) Int. Cl.
*G06F 3/00* (2006.01)
*G06F 9/445* (2018.01)
*G06F 8/34* (2018.01)

(52) U.S. Cl.
CPC ............ *G06F 9/44526* (2013.01); *G06F 8/34* (2013.01)

(58) Field of Classification Search
CPC ........... G06F 9/54; G06F 11/3636; G96F 9/54
USPC ......................................................... 719/310
See application file for complete search history.

(56) References Cited

U.S. PATENT DOCUMENTS

| 9,098,174 B1* | 8/2015 | Charytoniuk ........... G06F 16/95 |
| 2005/0138004 A1* | 6/2005 | Teplitsky ............ G06F 16/9566 |
| 2008/0022213 A1* | 1/2008 | Sugimura .............. G06Q 10/10 |
| | | 715/744 |

(Continued)

FOREIGN PATENT DOCUMENTS

| CA | 2867533 A1 * | 9/2013 | ............. G06F 17/21 |
| KR | 20080031455 A * | 9/2013 | |

OTHER PUBLICATIONS

Leslie Carr, The Distributed Link Service: A Tool for Publishers, Authors and Readers. (Year: 1995).*

(Continued)

*Primary Examiner* — Lechi Truong
(74) *Attorney, Agent, or Firm* — Wong & Rees LLP; Kirk D. Wong

(57) ABSTRACT

Approaches, techniques, and mechanisms are disclosed for flexible and dynamic modification of elements within textual content to provide an enhanced interface for development or other activities with respect to those elements. In an embodiment, the elements may be augmented with links by which users may quickly access associated items in development tools or other resources. For example, in an embodiment, the elements may be specific lines or blocks of code mentioned in a stack trace or error message. The elements may be transformed into links that, for instance, open the file containing the mentioned line or block of code, and optionally scroll specifically to the mentioned line or block of code. In an embodiment, the elements are specific passages within web pages that match trigger conditions specified by rules encapsulated in a user-customizable client-side plug-in, extensions, or bookmarklet. Proxy-based or server-based implementations may also be used.

18 Claims, 13 Drawing Sheets

(56) References Cited

U.S. PATENT DOCUMENTS

| | | | | |
|---|---|---|---|---|
| 2011/0178973 A1* | 7/2011 | Lopez | ............... | G06F 40/166 |
| | | | | 706/48 |
| 2014/0280012 A1* | 9/2014 | Feuerlein | ............ | G06F 16/9566 |
| | | | | 707/709 |
| 2016/0162450 A1* | 6/2016 | Chugh | ............... | G06F 40/134 |
| | | | | 715/207 |
| 2020/0097389 A1* | 3/2020 | Smith | ................. | G06N 3/084 |
| 2020/0250255 A1* | 8/2020 | Van Rotterdam | ... | G06F 3/04845 |

OTHER PUBLICATIONS

Lucas Pelloni, BECLoMA: Augmenting Stack Traces with User Review Information. (Year: 2018).*
Pratheepan Yogarajah, Embed, track and authenticate images online with SDW-WebCrawler (Year: 2011).*
Michal Sima, Web Graph Visualizer, 2011.*

* cited by examiner

FIG. 6A

Code listing 6.3: StackTraceExample.java
```
1  public class StackTraceExample {
2    public static void main(String[] args) {
3      method1();
4    }
5
6    public static void method1() {
7      method11();
8    }
9
10   public static void method11() {
11     method111();
12   }
13
14   public static void method111() {
15     throw new NullPointerException("Fictitious NullPointerException");
16   }
17 }
```

Output for Code listing 6.3

Exception in thread "main" java.lang.NullPointerException:
Fictitious NullPointerException
    at StackTraceExample.method111(StackTraceExample.java:15)
    at StackTraceExample.method11(StackTraceExample.java:11)
    at StackTraceExample.method1(StackTraceExample.java:7)
    at StackTraceExample.main(StackTraceExample.java:3)

FIG. 6B

```
Code listing 6.3: StackTraceExample.java
1  public class StackTraceExample {
2    public static void main(String[] args) {
3      method1();
4    }
5
6    public static void method1() {
7      method11();
8    }
9
10   public static void method11() {
11     method111();
12   }
13
14   public static void method111() {
15     throw new NullPointerException("Fictitious NullPointerException");
16   }
17 }
```

Output for Code listing 6.3

```
Exception in thread "main" java.lang.NullPointerException:
Fictitious NullPointerException
    at StackTraceExample.method111(StackTraceExample.java:15)
    at StackTraceExample.method11(StackTraceExample.java:11)
    at StackTraceExample.method1(StackTraceExample.java:7)
    at StackTraceExample.main(StackTraceExample.java:3)
```

DYNAMIC LINKING OF CONTENT ELEMENTS TO DEVELOPMENT TOOL RESOURCES

TECHNICAL FIELD

Embodiments relate generally content augmentation, and, more specifically, to techniques for linking content elements to resources in development tool environments.

BACKGROUND

Software development can be a complicated process involving a variety of development tools that are utilized for a variety of processes. Some examples of development tools include, without limitation, source code editors, code repositories, version control tools, compilation and linking tools, build automation tools, debuggers, bug databases, automated testing frameworks, code analysis tools, documentation generators, graphical user interface ("GUI") generators, and so forth. Development tools may be software applications running locally on a computing system, such as in a desktop or command-line environment, or development tools may be server-based applications accessible via a web browser, application programming interface ("API"), or virtual environment. Development tools may provide access to and/or allow manipulation of code and data stored within files in a local file system, server-based file system, database, or other suitable repository.

A set of software development tools used together is often referred to as a development environment. An integrated development environment combines the features of many development tools together in one package, often in such a manner that a user may conveniently switch back and forth between tools while remaining in a same context (e.g., in a same file, block of code, etc.).

With the proliferation of development tools and platforms, and in particular web-based development tools accessed via a web browser, an integrated development environment ("IDE") that fully integrates the tools used by a developer in an interface that is efficient for the developer may be unavailable. More generally, developers and other users of computing systems often lack useful mechanisms by which they may efficiently access additional resources that may be useful for particular code, messages, textual passages, web pages, documents, or other elements with respect to which they may currently be operating.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIGS. 6A-6B illustrate the augmentation of a stack trace outputted for an example program;

DETAILED DESCRIPTION

Figure 1:
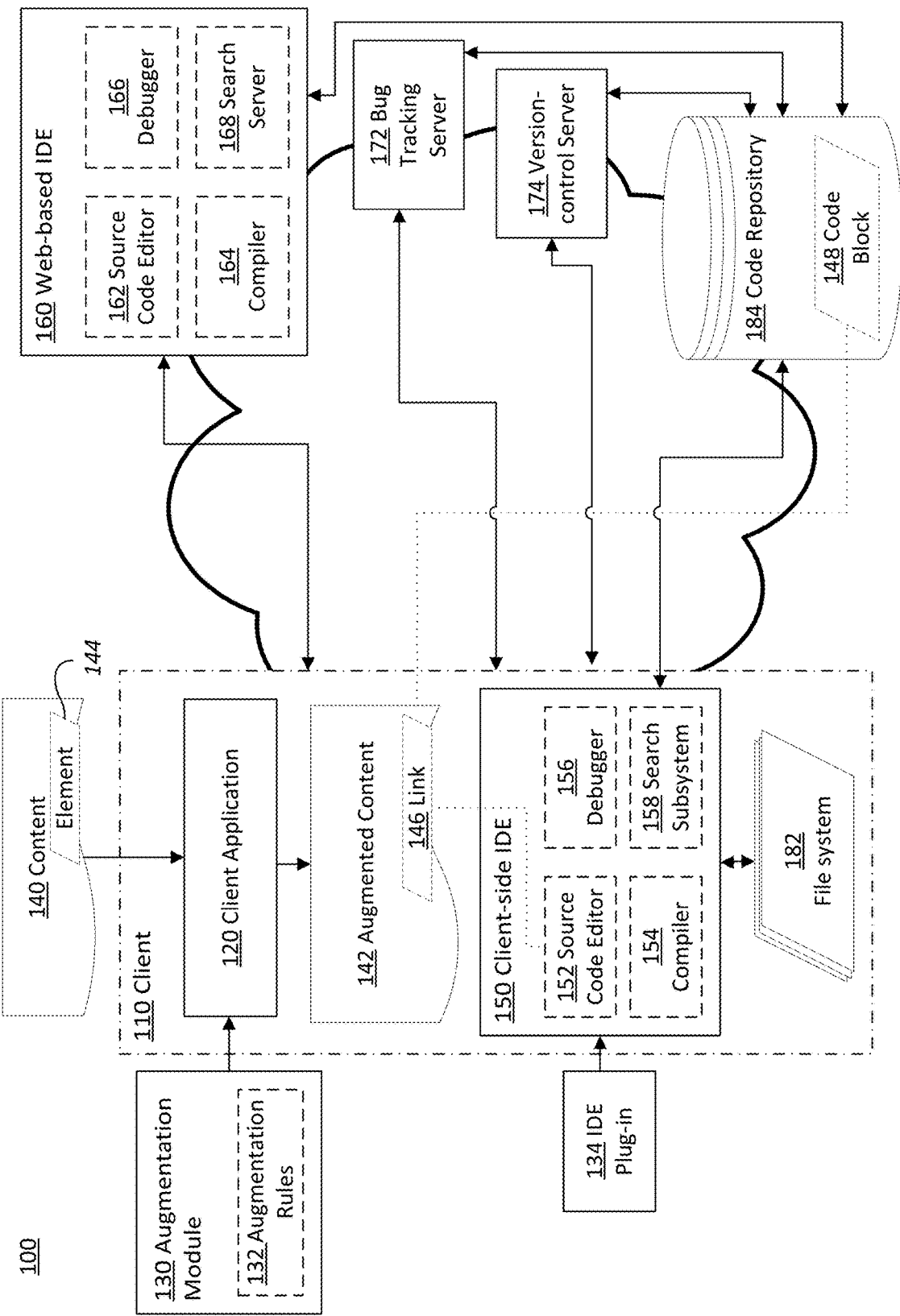
FIG. 1 is an illustrative view of various aspects of an example system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
  2.1. Content-Display Application
  2.2. Development Tools
  2.3. Content Augmentation Module
  2.4. IDE Plug-in
  2.5. Proxy Server
  2.6. Miscellaneous
3.0. Example Augmented Content
4.0. Functional Overview
5.0. Example Embodiments
6.0. Implementation Mechanism—Hardware Overview
7.0. Extensions and Alternatives

1.0. General Overview

Approaches, techniques, and mechanisms are disclosed for flexible and dynamic modification of elements within textual content, such as error messages or reports, to provide an enhanced interface for development or other activities with respect to those elements. In an embodiment, the elements may be augmented with links by which users may quickly access associated items in development tools, applications, or other resources. The links are interface controls that, when activated, cause the associated items to be opened within the relevant resources, and/or optionally cause performance of one or more specified actions with respect to the associated items. For example, in an embodiment, the elements may be specific lines or blocks of code mentioned in a stack trace or error message. The elements may be transformed into links that, for instance, open the file containing the mentioned line or block of code, and optionally scroll specifically to the mentioned line or block of code.

In an embodiment, the elements to augment are identified dynamically based on parsing a document, web page, or other content using one or more trigger conditions specified by one or more content augmentation rules. An element that matches a specific trigger condition is said to be a trigger string. A rule may include logic for determining an item that is associated with the trigger string, generating a link that opens the associated item in one or more suitable development tools or other resources, and modifies the relevant content, or a rendering thereof, so as to associate the link with the trigger string.

In an embodiment, an application that is displaying content, also referred to as a content-viewing application, may be configured to dynamically apply the rules to the content. The application may, for example, modify the content by embedding any identified trigger strings in links generated for the trigger strings immediately before the content is displayed, or insert the links within the rendered content. In an embodiment, the rules may be encapsulated in one or more scripts executed by the application. Such a script may be executed automatically whenever content is viewed, or on-demand at the request of a user. In an embodiment, the script may be a user-customizable plug-in, module, or extension of the content-viewing application.

In an embodiment, the content-viewing application is a web browser, and the trigger strings are specific passages that match the specified trigger conditions within web pages loaded by the web browser. The rules may be encapsulated in a client-side browser plug-in or extension, or in a bookmarklet that a user may click on when wanting to augment content being viewed.

In an embodiment, the rules may be implemented by logic on a proxy server that monitors content being delivered to one or more clients in a group of clients, and dynamically modifies the content by inserting links. The clients may upload rules to the proxy server, and the rules may be applied to content sent to some or all of the clients, depending on the rules and the context. In yet other embodiments, the rules may be implemented by logic at a web server that modifies content requested by a client before sending the content to the client.

In an embodiment, a trigger string may be linked to more than one development tool and/or associated item. For example, the trigger string may match more than one rule, and each rule may identify a different item that is associated with the trigger string, a different development tool in which to open the associated item, and/or a different action to perform with the associated item. In such cases, multiple links may be displayed for the trigger string. For instance, the trigger string may be augmented with a menu interface control that, when activated, displays multiple sub-controls, each associated with a different link.

In other aspects, the inventive subject matter encompasses computer apparatuses and computer-readable media configured to carry out the foregoing techniques.

2.0. Structural Overview

FIG. 1 is an illustrative view of various aspects of an example system 100 in which the techniques described herein may be practiced, according to an embodiment. System 100 comprises a plurality of computing devices. These computing devices comprise any combination of hardware and software configured to implement the various logical components described herein, including components 110-184. For example, the computing devices may include one or more memories storing instructions for implementing the various components described herein, one or more hardware processors configured to execute the instructions stored in the one or more memories, and various data repositories in the one or more memories for storing data structures utilized and manipulated by the various components.

In an embodiment, system 100 is a server-based system comprising one or more server devices configured to communicate with client devices, such as client device 110, over one or more networks, including the Internet, intranets, virtual private networks, and so forth. The one or more server devices may be, for instance, computers configured to execute logic for web servers, database servers, application servers, and/or any other types of servers. In an embodiment, some or all of the server devices are implemented within a distributed, multi-tenant enterprise application system comprising multiple, geographically separated data centers collectively configured to work together in one or more clusters to provide certain functions described herein. In yet other embodiments, the server devices may be implemented within a single data center.

Though not depicted, system 100 may comprise any suitable set of other components necessary to provide the functionality described herein, such as network switches, routers, and/or other networking devices, storage systems, memories, and so forth.

2.1. Content-Display Application

Client device 110 may be any suitable type of computing device. The client device 110 may be, for example, and without limitation, a desktop computer, portable computing device, smartphone, virtual machine, and so forth. Client device 110 is operated by one or more users for various activities that include viewing content such as content 140.

Client device 110 may operate one or more client applications 120 configured to display content. In an embodiment, the client application 120 is or comprises a general-purpose web browser that is configured to display content in the form of Hyper-Text Markup Language ("HTML") encoded documents, commonly referred to as web pages. In another embodiment, the client application 120 may be a special-purpose application, such as a desktop or smartphone application utilized for messaging, software development, word processing, database access, data reporting or analysis, command-line console, or other purposes. Content 140 may include any textual output displayed by these applications, such as dialog windows, prompts, or documents in other formats.

The client application 120 may request and receive content from server devices across one or more networks. For instance, if content 140 is a web page, the client application may request and receive the content 140 using the Hyper-Text Transfer Protocol ("HTTP"). As another example, content 140 may be or include text or other data requested and received via a Representational State Transfer ("REST") based Application Programming Interface ("API") or any other suitable API and/or protocol. The server devices from which the content 140 may be requested include both server devices depicted in FIG. 1 as well as other non-depicted web servers. A client application 120 may also or instead display content 140 that is generated locally. For instance, content 140 may be a dialogue window, web page, or document that is generated locally.

Content 140 may be of any substance. In some embodiments, content 140 may include output that is relevant to software development activities at the client device 110. For example, content 140 may include logs from compilation, interpretation, debugging, or execution of a software application. In an embodiment, content 140 may be a report of one or more errors outputted by a bug database or testing framework.

In an embodiment, content 140 may be a stack trace, which is a report of active stack frames at a certain point during execution of a program. The certain point may often be at the time of an error, and thus the stack trace may also function as a sort of error log. The certain point may also be other points of interest to a developer, such as pre-identified breakpoints in a software application, or a certain point during the generation of a web page into which a developer has requested that a web application insert debug output.

In an embodiment, a stack trace, error log, or other type of content 140 may identify one or more specific subroutines, classes, or functions by file name and/or other suitable identification mechanisms. Optionally, the content 140 may identify specific lines or blocks of code that were being executed when the content 140 was being generated.

In yet other embodiments, the content 140 may take a variety of other forms and have other elements related to software development or other activities of interest to a user.

2.2. Development Tools

Client device 110 is further configured to execute one or more IDEs comprising various software development tools, such as the depicted development tools 152-158. In an embodiment, client device 110 may more specifically execute a client-side IDE 150, comprising various client-side graphical or command-line interfaces for development tools. For instance, IDE 150 may be a desktop application, or suite of desktop applications.

Among other tools, a client-side IDE 150 may include, for example, one or more source code editors 152, in which a user may create or open files or other constructs comprising computer program code, and view and/or edit that code. In some embodiments, the source code editor(s) 152 may be adapted for specific programming languages and/or frameworks, and provide various functionality to assist in editing code in those languages and/or for those frameworks, such as syntax-based highlighting. Client-side IDE 150 may further include one or more compilers 154 configured to compile the code into a lower-level machine language. The IDE 150 may further include a runtime engine for executing the compiled code, or the compiled code may be executed by a hardware component or operating system component. In an embodiment, the IDE 150 may also or instead include one or more interpreters that interprets the code rather than compiles it. In an embodiment, the IDE 150 includes one or more debuggers 156 configured to assist a developer in debugging computer program code as the code is executed or interpreted. A debugger 156 may, for instance, allow a developer to pause execution of the code at a specific function, line, or block of code, and inspect various memory structures. The IDE 150 may further include other development tools, such as one or more search subsystems 158 that allow a developer to search for specific keywords, objects, structures, and so forth in a repository of computer code.

The various tools of IDE 150 may operate with respect to code stored in various types of repositories, including a local file system 182 of client device 110. This file system 182 may include various files of code which may be stored in various directories. In some embodiments, the client device 110 may synchronize the file system 182, or specific portions thereof, with one or more external repositories using file sharing and/or version control software. For instance, specific "projects" comprised of various directories of files may be synchronized with a cloud-based code repository 184 using a version control server 174. In an embodiment, version control server 174 may provide a web-based interface to code repository 184 as well as its own source-code editor 162.

In some embodiments, instead of storing all code accessed by client-side IDE 150 in the file system 182, the client-side IDE 150 may be configured to temporarily store or cache various blocks of code from the code repository 184 only as needed for editing, compilation, or other tasks. Client-side IDE 150 may utilize any suitable protocol for communicating the necessary code to and from code repository 184.

Although the depicted repository of code used by client-side IDE is a file system 182, client-side IDE 150 may also or instead store code in other types of repositories, including a database. Similarly, code repository 184 may take any suitable form.

In an embodiment, client device 110 may also or instead be configured to provide access to a web-based IDE 160, comprising various web-based interfaces for development tools. The web-based IDE 160 and other web-based development tools may be accessed via a web browser or other thin-client application on the client device 110, which may be the same as or different from the client application 120. A web-based IDE 160 may be implemented using web pages, client-side scripts, JavaScript-Object Notation ("JSON") data, and/or other structures that, when received and interpreted by a web browser or other suitable thin-client application, cause the client device 110 to present graphical interfaces for performing the functions of various development tools.

The web-based IDE 160 may include some or all of the same types of components as in client-side IDE 150, including a source code editor 162, compiler 164, debugger 166, and search server 168. However, whereas client-side IDE 150 may operate on locally stored file data, web-based IDE 160 may store, compile, debug, and execute code on one or more server devices. Such server devices may directly access the code in a code repository 184, or synchronize the code in similar manner to the client device 110, depending on the embodiment.

In an embodiment, some or all of the development tools in IDEs 150 and 160 may be standalone tools instead of tools that have been integrated into an IDE. For instance, source code editor 152 may be an entirely separate application than compiler 154. Or, debugger 166 may be a web application executing on an entirely different web server system than source code editor 162.

In an embodiment, a client device 110 may execute more than one client-side IDE 150 and/or more than one web-based IDE 160. In an embodiment, an IDE may include both client-side tools and web-based tools. For instance, the IDE may include its own browsing engine or other software to access various web-based tools, such as a search server 168 and version control server 174, while keeping other tools like the compiler 154 local. In an embodiment, a client device 110 need not necessarily be configured to execute both a web-based IDE 160 and a client-side IDE 150, but may only access one or the other.

In an embodiment, a client device 110 is further configured to access a bug tracking server 172 via a web browser or other suitable software. The bug tracking server 172 includes various mechanisms for listing and/or searching for bugs that have been entered into a database, either by other developers or by an automated testing tool. In an embodiment, a client device 110 may further have access to a variety of other non-depicted development tools, both local and cloud-based, including without limitation any other development tool mentioned in this disclosure.

In an embodiment, a client device 110 may further provide access to one or more IDEs or standalone development tools in a virtualized environment, running either locally or on a remote server. In an embodiment, client device 110 may itself be a virtual machine.

In an embodiment, the client application 120 may be included in the IDE 150. For instance, the IDE 150 may include its own browser. Or, the client application 120 may be one of the development tools in the IDE 150.

2.3. Content Augmentation Module

Content 140 displayed by client application 120 may at times be related to specific blocks of codes accessible to various local and/or cloud-based development tools accessible to client device 110. For instance, content 140 may be a web page outputted by a web server running a certain web application implemented by code being developed by a user of client device 110. The content 140 may include stack traces when encountering an error, or in certain pages in which the developer has requested debugging information. As another example, content 140 may be a bug report from a bug-tracking server 172, that mentions a specific block of code.

When content 140 may include information related to specific blocks of code, it is often desirable for the developer to view and/or perform other actions related to those blocks of codes in one or more development tools. Typically, to do so, the developer must launch the relevant development tool, identify the file or other location of the block code in content 140, manually browse file system 182 or code repository 184 for that location, open that location in the development tool, browse to the relevant line or block of code within the opened file or location, and, if another action is desired, instruct the development tool to perform that other action.

In an embodiment, system 100 includes an improved interface for accessing functionality related to content being viewed in the client application 120. A content augmentation module 130 is included in or added to the client application 120. Generally, the content augmentation module 130 analyzes content 140 being presented in the client application 120 to identify elements 144 (i.e., "trigger strings") within that content 140 that are related to some target context. The content augmentation module 130 then augments the content 140 by modifying either the content 140 directly, or a rendering of the content 140 (e.g., a document-object model, dialog window, etc.), with one or more links 146 that link each trigger string to an associated target context. The modified content 140, or rendering thereof, is said to be augmented content 142.

Target Context

A target context may include a target application, a target item, and, optionally, a target action to perform with the target item in the target application. When clicked, a link 146 causes the client device 110 to launch the corresponding target application, open the corresponding target item in the target application, and optionally instruct the target application to perform the corresponding target action with respect to the target item.

The target application may be any of a variety of applications, including client-side and/or web-based applications. The applications may include, for instance, client-side IDE 150 or web-based IDE 160, specific development tools therein, any other development tool depicted in FIG. 1, as well as other non-depicted development tools and applications. In at least some embodiments, the target application is a development tool that is entirely separate from the client application (e.g., not within the same IDE), and thus would not otherwise be accessible via the content 140.

The target item may be any sort of electronic item, such as a file, directory, data structure, and so forth. For instance, in an embodiment, the target item may be a file in file repository 182. As another example, the target item may be a code block 148 in code repository 184, such as a function, class, object, structure, and so forth. In an embodiment, the target item need not be known to actually exist—for instance, the target item may be a set of one or more keywords that the target application may or may not resolve to a specific item via a search against a repository of items.

The target action may again be any suitable action. For instance, the target action may be opening the item to a specific line or block of code, setting a breakpoint for a debugger, starting a debugger, validating a code block, executing a code block, searching for references to a code block, and so forth.

Content Augmentation Rules

The content augmentation module 130 uses augmentation rules 132 to identify trigger strings and associated target contexts. Rules 132 may take the form of specific statements within the code for content augmentation module 130, or as separate data (e.g., XML, JSON, etc.) that is input into the content augmentation module 130, depending on the embodiment.

Each augmentation rule 132 specifies a trigger condition, such as a pattern and/or other search parameters by which trigger strings may be identified. A pattern may be specified using keywords, textual sequences, trees, regular expressions, or any other suitable pattern-matching mechanism. The content augmentation module 130 parses the content 140, or a rendering thereof, to locate portions of the content 140 that match the trigger condition. Each matching portion is considered to be a separate trigger string. For instance, for the pattern "*.cpp", the following are example trigger strings might be found in the content 140 "main.cpp", "test.cpp", and "server.cpp". As another example, a pattern may match formatting known to correspond to functions, classes, objects, or other distinct types of code blocks.

A content augmentation rule 132 further includes, for any matching trigger string, information based upon which an associated target context may be identified. The rule may, for example, specify the target application and action directly. Or, different target applications and/or actions may be mapped to different trigger strings or sets of trigger strings. For instance, all trigger strings having a certain file extension (or some other pattern) may be mapped to one target application, while all trigger strings having another file extension (or some other pattern) may be mapped to another target application.

Meanwhile, the rule may include logic by which the target item may be determined. The logic may, for example, be a function of the trigger string. The trigger string may itself be the name of the target item. Or, the trigger string may form a portion of the name of the target item.

For instance, the logic may prepend one or more directories, domain names, or other locations to the trigger string to determine the name of the target item. As yet another example, the logic may employ a more complex transformation of the trigger string into the name of a target item, such as by inserting into and/or replacing portions of trigger string with other text. As yet another example, the logic may be a lookup mechanism, whereby a specific trigger string (or pattern) is mapped to a specific target item.

There may be any number of content augmentation rules 132, and each content augmentation rule 132 may be used to identify any number of matching trigger strings. Moreover, each content augmentation rule 132 may specify any number of target contexts for each trigger string that matches the rule 132. Note that some content 140 may not include any matching trigger strings for the rules 132, in which case no augmented content 142 would be generated.

The exact set of content augmentation rules 132 may vary from embodiment to embodiment and even user to user. In an embodiment, content augmentation rules 132 are user-editable. In an embodiment, content augmentation rules 132 are stored on a server from which they may be accessed by multiple client devices 110. Each client device 110 may share the same rules 132, or the specific rules used at a client device 132 may be selected by a user.

Link Behavior

The augmented content 142 may link to the target context using any suitable linking mechanism. The trigger string may be highlighted and/or otherwise visually distinguished to indicate that a link is associated therewith. Or, a control such as a button or image may be placed within the vicinity of the trigger string, which the user may then select. Activating the trigger string or the associated control (e.g., selecting, clicking on, hovering over, etc.) may immediately launch the target application, or a pop-up menu may be overlaid upon the augmented content 130. The menu may include separate controls for each target context associated with the trigger string, and the user may select one of these controls to access the corresponding target context.

The target application may be opened in a separate screen or window. Or, in the case of a development tool designed to be accessed using client application 120 (e.g., where client application 120 is a web browser), the target application may be opened within the client application 120, either in the same window and tab as augmented content 142, or in a different window and/or tab. The target application immediately opens the target item and performs the indicated target action.

Example Content Augmentation Module

Figure 2:
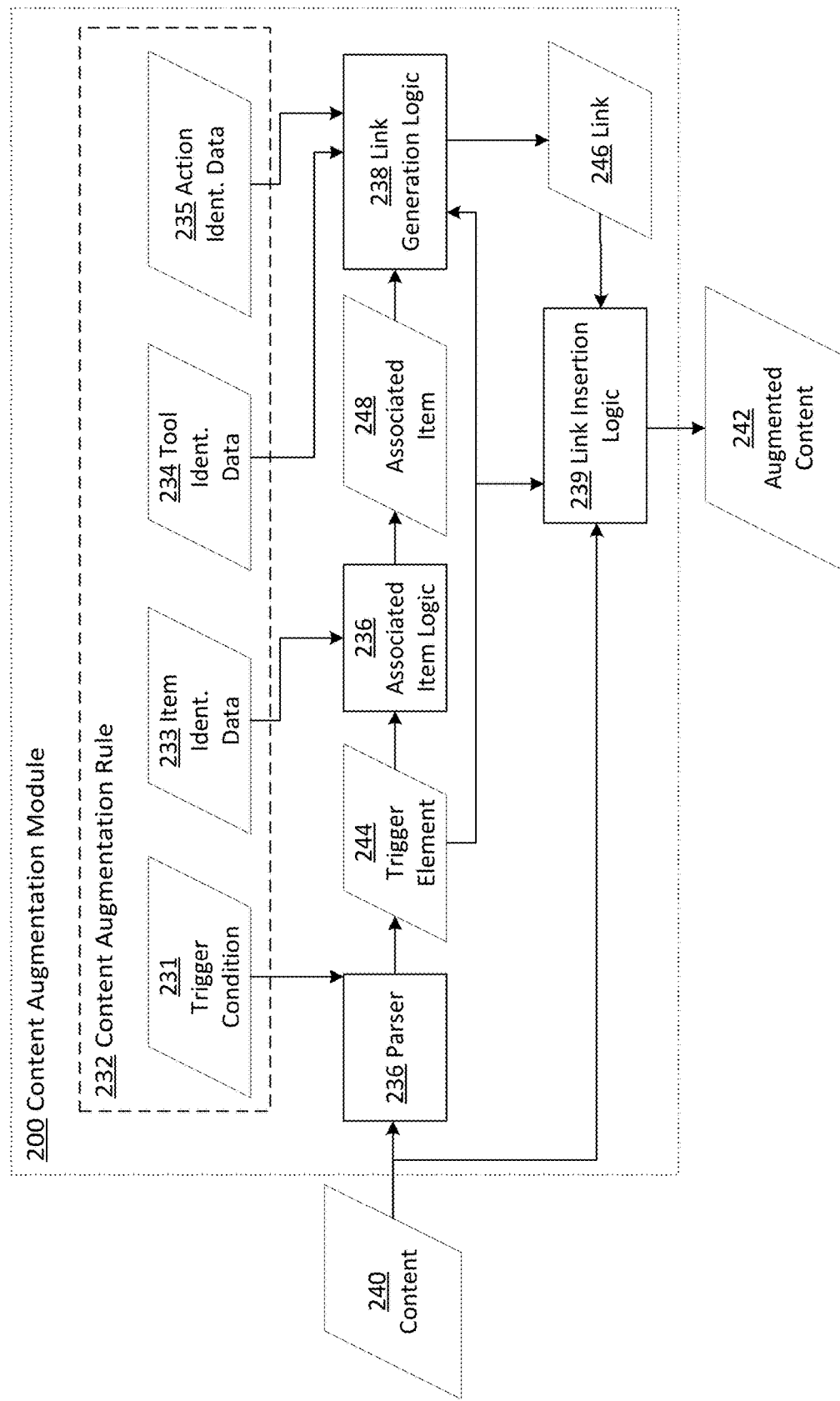
FIG. 2 illustrates an example content augmentation module.

FIG. 2 illustrates an example content augmentation module 200, according to an embodiment. Content augmentation module 200 is one example of a content augmentation module 130, and in other embodiments content augmentation module 130 may take other forms. Moreover, content augmentation module 200 may be utilized in contexts other than system 100.

Content augmentation module 200 generates augmented content 242 from content 240. Content 240 is similar in nature to content 140, while augmented content 242 is similar in nature to augmented content 142.

Content augmentation module 200 utilizes one or more content augmentation rules 232 to augment content 240. Each rule 232 includes a trigger condition 231 and tool identification data 234. Optionally, a rule may further include action identification data 235.

The trigger condition 231 may be, for example, any suitable pattern for identifying a trigger string, as described above. A parser 236 within the content augmentation module 200 uses each rule's trigger condition 231 to identify trigger strings 244. More specifically, the parser 236 is configured to input and parse content 240, searching for elements 244 that match each trigger condition 231 for each rule 232.

When a trigger string 244 is found, the trigger string 244 and an identifier of the matched rule 232 are inputted into associated item logic 236. The associated item logic 236 utilizes item identification data 233 in the matched rule 232 to identifying a target item 248 that is associated with the trigger string 244. Depending on the embodiment and/or the specific rule 232, the item identification data 233 may specify the associated item 248 in a variety of manners. For instance, the item identification data 233 may specify a regular expression or formula for transforming the trigger string into the associated item 248 (e.g., by substitution or insertion of location data or other text into the trigger string). The item identification data 233 may also or instead specify a mapping of a trigger string 244, or a matched pattern within the trigger string 244, to a specific item 248. In an embodiment, the target element 244 and the associated item 248 are the same.

Each associated item 248 is inputted into link generation logic 238, along with information indicating which rule 232 was matched. The link generation 238 then inputs tool identification data 234 and action identification data 235, if any, from the matched rule 232. The tool identification data 234 may indicate a location at which an appropriate development tool to open the associated item 248 is located. The tool may be the same for all trigger strings 244 that match the rule, or the content augmentation module 200 may further include tool identification logic by which an appropriate tool is identified based on the associated item 248 and/or trigger string 244. The location may be indicated by, for instance, the name of a local file to execute at the client device, a Uniform Resource Locator ("URL") or other Uniform Resource Indicator ("URI") of a remote server at which the development tool may be accessed, a protocol or scheme registered to the tool, or any other suitable name or locator.

The action identification data 235, if specified, may likewise indicate an action directly, or provide a formula or mapping based upon which the target action may be determined.

The link generation logic 238 uses the location of the development tool, the name of the associated item 248, and the name of the action to construct a link 246 with which to augment the trigger string 244 in the content 240. The link 246 may be, for instance, a URI that combines the target item, location, and action. Or, the link 246 may be a set of one or more instructions for launching the target application, opening the associated item 248 in the target item in the target application, and performing the target action.

In some embodiments, the link 246 may further include interface control information that indicates how and where to display a control in the augmented content for activating the link 246. In other embodiments, such a control may be implicit from the link 246 itself.

The link 246 is inputted into the link insertion logic 239, along with the trigger string 244 for which the link 246 was generated and the original content 240. The link insertion logic 239 inserts the link 246 into the content 240 at some or even all instances of the trigger string 244, using any suitable insertion technique. After each link 246 generated by the content augmentation module 200 has been inserted into the content 240, the content 240 is said to be augmented content 242.

In an embodiment where the content 240 is a web page, the link insertion logic 239 may insert a link 246 to a target context by transforming the trigger string 244 into a hyperlink. This is done by wrapping the trigger string 244 in an <a> markup tag, whose href attribute is the link 246. In another embodiment, the link insertion logic 239 may instruct the client application that displays the augmented content 242 to modify a document-object model to similar effect, or to overlay a control that activates the generated link 246.

Example Link Construction

The URI generated by the link generation logic 238 should be configured to instruct the target application to open the target item 248 and perform the target action, if any. Although the URI may identify the target context in a variety of manners, in an embodiment, the first portion of the URI generally indicates the target application, while a second portion and third portion may indicate a target item and a target action, in varying orders. The exact manner in which this is indicated may depend on whether the target application is a standalone application that can be executed independently, or an application that is intended to be accessed in a general-purpose browser or other thin-client interface.

For standalone applications, the URI will typically begin with a starting portion that the client device maps directly the target application, such as a scheme indicator (e.g. "ide://" or "editor://"). The remaining portions would then specify the target item and action, such as "ide://action#target" or "ide://target?action." The exact format of the URI will depend on the target application, as each target application may have its own convention for specifying items and actions to perform. The content augmentation rules 232 may therefore be adapted to the specific target applications desired by the user.

For other applications, the URI will typically begin with a scheme indicator that the client device maps to the web browser or other interface, such as "https:". A domain name or IP address then follows, which corresponds to the location on the network at which the target application is reachable. The domain name or IP address may or may not sufficiently identify the target application, depending on how the server at that address is configured.

A path then follows the domain name. If the target application is not already sufficiently specified, the first part of the path, or maybe even the entire path, may identify the target application. The target item and action may then be specified using a second part of the path, a query string, and/or a target identifier. Hence, some valid arrangements of the URI might include "http://application/item#action", "http://domain/application/action?item", "http://domain/application?action&item", and so forth. Again, the exact format of the URI will depend on the configuration of the target application.

In an embodiment, instead of being linked to a URI, a hyperlink or other control may contain JavaScript-based instructions or other code that instructs the client device to open the target item in the target application and perform the target action. The content augmentation module 200 may thus be configured to generate this code based on the target context, instead of constructing a URI.

Miscellaneous

Returning to FIG. 1, depending on the embodiment, the content augmentation module 130 may automatically augment content 140, or augment content 140 only if requested to do so. In the former case, the client application 120 may be configured to run the content augmentation module 130 automatically before the content 140 is rendered (e.g. modifying the content 140 directly) and/or immediately after the content 140 is rendered (e.g. modifying a document-object model in the web browser). In the latter case, the content augmentation module 130 may cause the client application 120 to display a certain control (e.g. a menu option, button, bookmark, etc.) that a user may activate whenever the user wishes to initiate the content augmentation process for content 140 that has already been presented and rendered in the client application 120.

In an embodiment, the client application 120 only performs the automatic augmentation for content 140 that has certain characteristics, such as being from a specified domain, or being of a certain content type.

In an embodiment, the augmentation module 130 is a plug-in or extension to the client application 120 that users of client device 110 may install to their device. Depending on the embodiment, the content augmentation module 130 may be a single file, or may include components spread across multiple files in potentially different locations. For example, the augmentation module 130 may include a client-side file or set of files that contain code necessary to initiate the content augmentation process, which in turn is configured to make a call to one or more other files stored on a server to load rules 132 and/or other code necessary for implementing the remaining functionality of the module 130.

In the latter case, on account of the rules 132 being stored on a server, content at multiple client devices 110 may conveniently be augmented in the same manner using the same rules 132. In an embodiment, the server may customize the code returned to different clients 130 so as to implement different rules 132 depending on the client 130. Optionally, the server may include a configuration interface by which users may specify rules and/or select which rules are to be applied at their client device 110. For instance, one rule 132 may specify that a trigger string that matches a file name that ends with .cpp. One user may wish to open associated items (i.e. the associated file) in a client-side IDE linked to a first repository, while another user may wish to open associated items in a web-based IDE linked to a second repository. Each user may customize the rule 132 so as to link the same trigger string to a different IDE. Yet another user may not wish to augment file names that end with .cpp at all, and thus disable the rule 132.

For embodiments in which client application 120 is or includes a web browser, the augmentation module 130 may be a JavaScript program that the client application 120 is configured to execute with respect to some or all of the web pages displayed by the client application 120. In an embodiment, the JavaScript program is embedded in a client-side browser extension or plug-in. In another embodiment, the JavaScript-based code includes a bookmarklet comprising client-side JavaScript that, when the bookmarklet is activated, initiates the content augmentation process and then calls additional JavaScript code stored locally and/or on a server.

2.4. IDE Plug-in

Some IDEs may not provide an interface by which augmented content 142 may directly link to certain target applications, actions, and/or items. For instance, IDE 150 may not support directly accessing specific development tools and/or actions directly from a link, or may be unaware of how to access a certain target item (e.g. not know what directory of file system 182 or what code repository 184 to access). In such cases, system 100 may further include an IDE Plug-in 134.

The IDE Plug-in 134 is a module of code that may be installed on the client device 110 to interface between the augmented content 142 and IDE 150 or its constituent tools 152-158. In some embodiments, the IDE Plug-in 134 may be installed directly within the IDE framework. When a link 146 to the IDE 150 is processed by the client device 110, the link 146 is first sent to the IDE framework, which then relays some or all of the link 146 to the IDE plug-in 134. The IDE Plug-in 134 may include code for performing some or all of: launching a specific development tool 152-158 targeted by the link 146, locating and opening the target item within that tool, and/or instructing the development tool to perform the requisite action.

In other embodiments, the IDE Plug-in 134 sits outside of the IDE 150. The link 146 is registered to the IDE Plug-in 134 instead of the IDE 150 directly. The IDE Plug-in 134 is then responsible for interfacing with the IDE 150 to instruct the IDE 150 to open the target application to the target item and perform the target action, if any.

In an embodiment, an IDE Plug-in 134 may also or instead be utilized for web-based IDE 160 or other web-based development tools. Instead of generating a link 146 directly to the web-based development tool, the content augmentation module 130 may generate a link 146 to the IDE Plug-in 134. The IDE Plug-in 134 may be deployed on a same or different server than the web-based development tool. In such cases, the IDE Plug-in 134 may perform such tasks as resolving the target item to a specific location accessible to the target application, relaying the link 146 to the target application with the resolved location information, translating the link 146 into suitable instructions for the web-based development tool, and so forth.

2.5. Proxy Server

Figure 3:
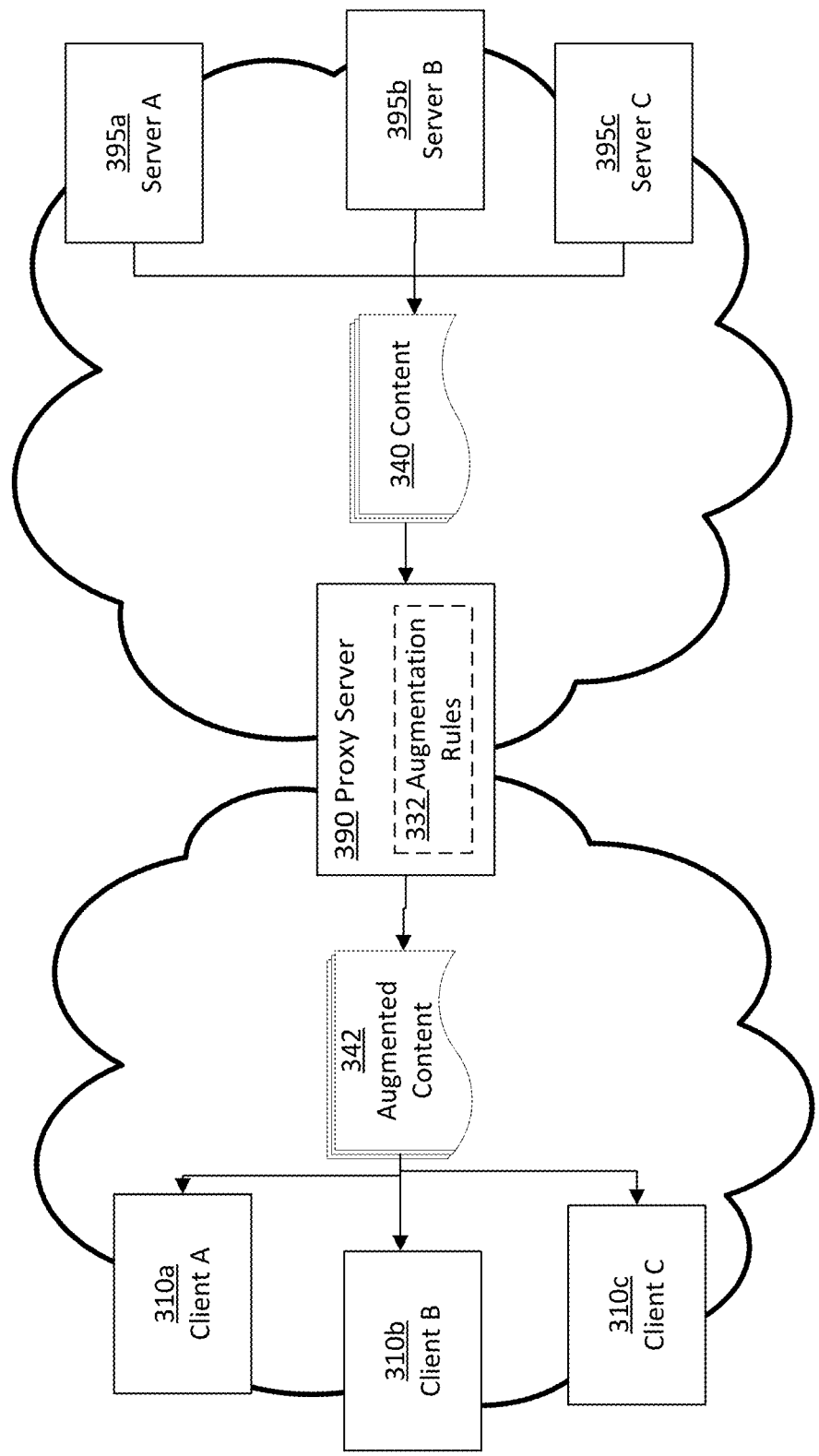
FIG. 3 illustrates a proxy-based content augmentation system.

According to an embodiment, instead of relying on a client-side module to augment content received over a network, a system may instead augment content at a proxy server situated between a client device and a server that sends the content to the client device. For example, FIG. 3 illustrates a proxy-based content augmentation system 300, according to an embodiment. System 300 comprises servers 395a-c (collectively "servers 395") that deliver contents 340 to clients 310a-c (collectively "clients 310").

Clients 310 are in many ways similar to client device 110. For instance, clients 310 each include at least one client application, such as a web browser, for viewing contents 340. Some or all of clients 310 may further include one or more client-side development tools, and/or provide access to one or more web-based development tools. Clients 310 need not necessarily have their own content augmentation module, as they may instead rely upon proxy server 390 to augment contents 340 before they arrive at the clients 310.

Servers 395 may be web servers or any other content server. There may be any number of servers 395, including just as single server 395. In an embodiment, some or all of the servers 395 may implement one or more development tools, such as web-based IDE 160, or development tools 162-174. In an embodiment, contents 340 may be web pages generated by the servers 395. For instance, the web pages may include interfaces for debugging a web application, execution logs, error logs, bug database reports, or other development-related content. In other embodiments, contents 340 may take other forms having other types of content.

Proxy server 390 may be any device configured to intercept and/or relay contents 340 as they are delivered to clients 310. Proxy server 390 may be, for instance, a gateway device sitting on the edge of an intranet in which clients 310 operate, a router, switch, or any other suitable network device. In some embodiments, URLs may be altered so that requests for contents 340 are directed through the proxy server 390, while in other embodiments, proxy server 390 is deployed in such a manner that the proxy server 390 may transparently monitor communications between clients 340 and external servers. Proxy server 390 comprises a content augmentation subsystem that is configured to inspect contents 340, identify trigger strings within the contents 340 based on augmentation rules 332, and augment contents 340, in similar manner to content augmentation module 130.

Proxy server 390 may augment all contents 340 in the same manner for all clients 310, or selectively apply augmentation rules 332, depending on the client 310. For instance, the proxy server 390 may include a configuration interface by which individual clients 310 may configure the proxy server 390 to apply specific augmentation rules 332. Different rules 332 may be enabled for different clients 310, in similar manner as described with respect to the server-based rules 132 above.

The proxy server 390 may thus generate different augmented content 342 for different clients 310, even if the original content 340 being augmented was the same. Moreover, for some clients, contents 340 may not be augmented at all. Note that, because the contents 340 are augmented before they reach the clients 310, the proxy server 390 may only augment contents 340 by modifying contents 340 directly.

In yet other embodiments, the proxy server 390 may be used to inject JavaScript or other code into the content 342 that, upon being interpreted at a client 310, causes the client 310 to execute augmentation code. In this manner, augmentation rules 342 may still be implemented at the client-side. Of course, such JavaScript may also be placed in the content 342 at server, either statically before the content 342 is ever requested, or dynamically in response to a request.

2.6. Miscellaneous

In an embodiment, an organization may utilize the above-described techniques to provide a more integrated development environment to an entire user base. For instance, the organization might deploy the proxy server 390 to transparently augment content to its user base. For instance, a software development company might deploy a proxy server 390 with augmentation rules 332 designed to augment web pages from outside development tool providers with links that launch code blocks associated with various trigger strings in certain internal development tools, thereby seamlessly integrating external and internal development resources. Similarly, the organization might host a JavaScript-based implementation of content augmentation module 130 on one of its internal servers, and install a bookmarklet that triggers augmentation functionality within that module in each user's web browser, allowing a user to conveniently request that a web page from an external server be augmented with links to internal development resources.

Note that the depicted systems 100 and 300 are merely several examples of systems in which the techniques may be described. Other systems may include additional, fewer, and/or different development tools. Moreover, there may be additional client devices or client applications, file systems, code repositories, and/or other components. Moreover, some embodiments may be strictly client-based, or strictly web-based. Furthermore, the example content augmentation module 200 is but one example of a content augmentation module. Other content augmentation modules may include fewer or additional elements in varying arrangements.

More generally, the techniques described herein may be utilized to augment a variety of other types of content, and not just content related to software development. For instance, content augmentation rules may be designed to link trigger strings corresponding to items such as persons, organizations, physical places, reports, bibliographic references, log entries, mathematical formulas, dates, genome sequences, or any of a variety of other types of elements to actions within database tools, web applications, data visualization tools, word processors, or any other suitable client-based or web-based application in addition to or instead of a development tool.

3.0. Example Augmented Content

Figure 4:
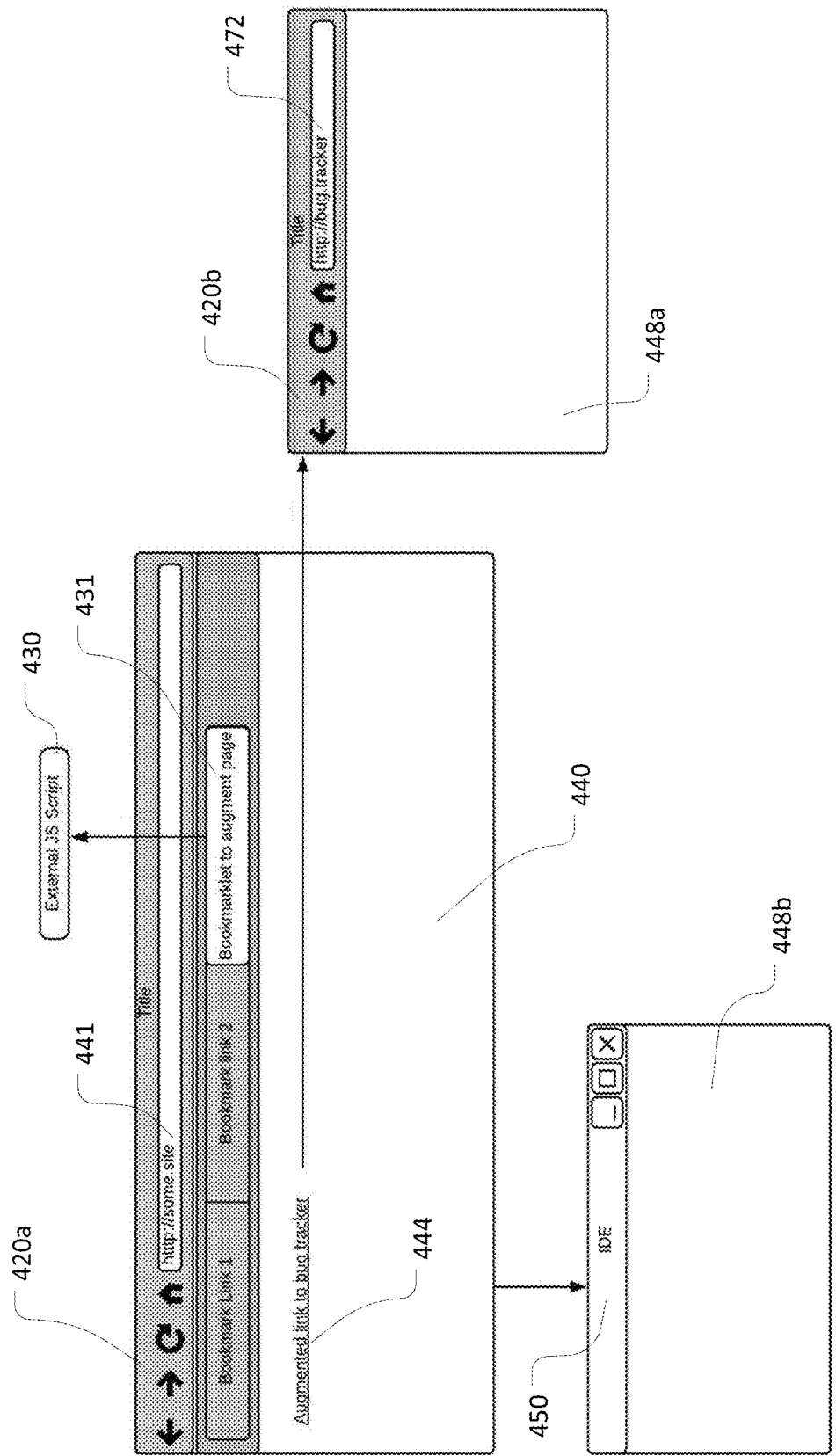
FIG. 4 illustrates various example interfaces related to the content augmentation process.

FIG. 4 illustrates various example interfaces related to the content augmentation process, according to an embodiment. A web browser window 420a is output by a web browser, and displays a web page 440. Web page 440 is an example of content 140 and 240, and web browser window 420a is an example of output from a client application 120, according to an embodiment. The web browser may have requested the web page via an HTTP request to a URL 441, which caused a web application associated with the URL to generate and send the web page 440 back to the web browser.

The web browser that displays window 420a has been configured to access a content augmentation script through a bookmarklet 430. The content augmentation script is in a JavaScript file stored at a certain path specified by the bookmarklet 430, which path may be local or remote. The content augmentation script is an example of a content augmentation module 130 and 230. The web browser window 420a has been configured to display a content augmentation activation button 431, which a user may click on at any time to begin augmenting content 440.

Upon the user clicking the button 431, the content augmentation script augments the trigger string 444 by transforming the trigger string 444 into a link. The link may launch different target applications depending upon the content augmentation rule(s) implemented by the content augmentation script.

Two examples are depicted in FIG. 4. First, the trigger string may be linked to a web-based bug tracker tool. In this case, the link instructs the web browser to open a new browser window 420b to a URL 472 that corresponds to the bug tracker tool. Though not depicted, the URL may further direct the bug tracker tool to open a specific target item 448a (e.g. bug report, search, etc.) that is associated with the target element 444. Second, the trigger string may be linked to a client-side IDE 450. The link instructs the user's operating system to execute the IDE 450 and open a file or other item 448b.

Of course, these are but two examples of target applications that the link may launch, depending on the content augmentation rule. Other examples may include, without limitation, a web-based IDE or other web-based development tool, other client-side development tools, or any other suitable application. Moreover, it will be appreciated that a variety of types of contents 440 may be similarly augmented, and that there may be any number of trigger strings within the content.

Figure 5A:
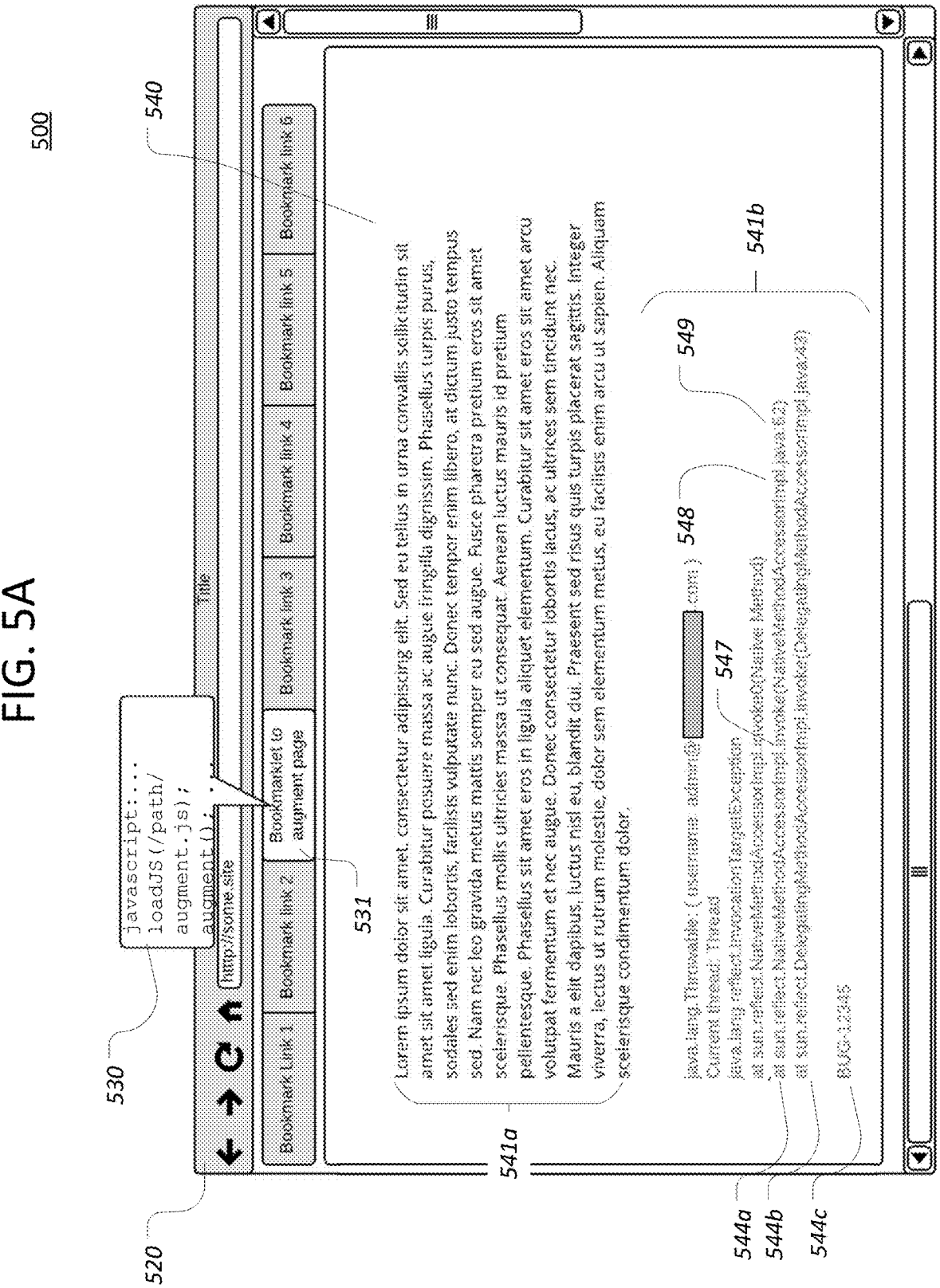
FIGS. 5A-5C illustrate the augmentation of an example web page displayed in a web browser window.
Figure 5B:
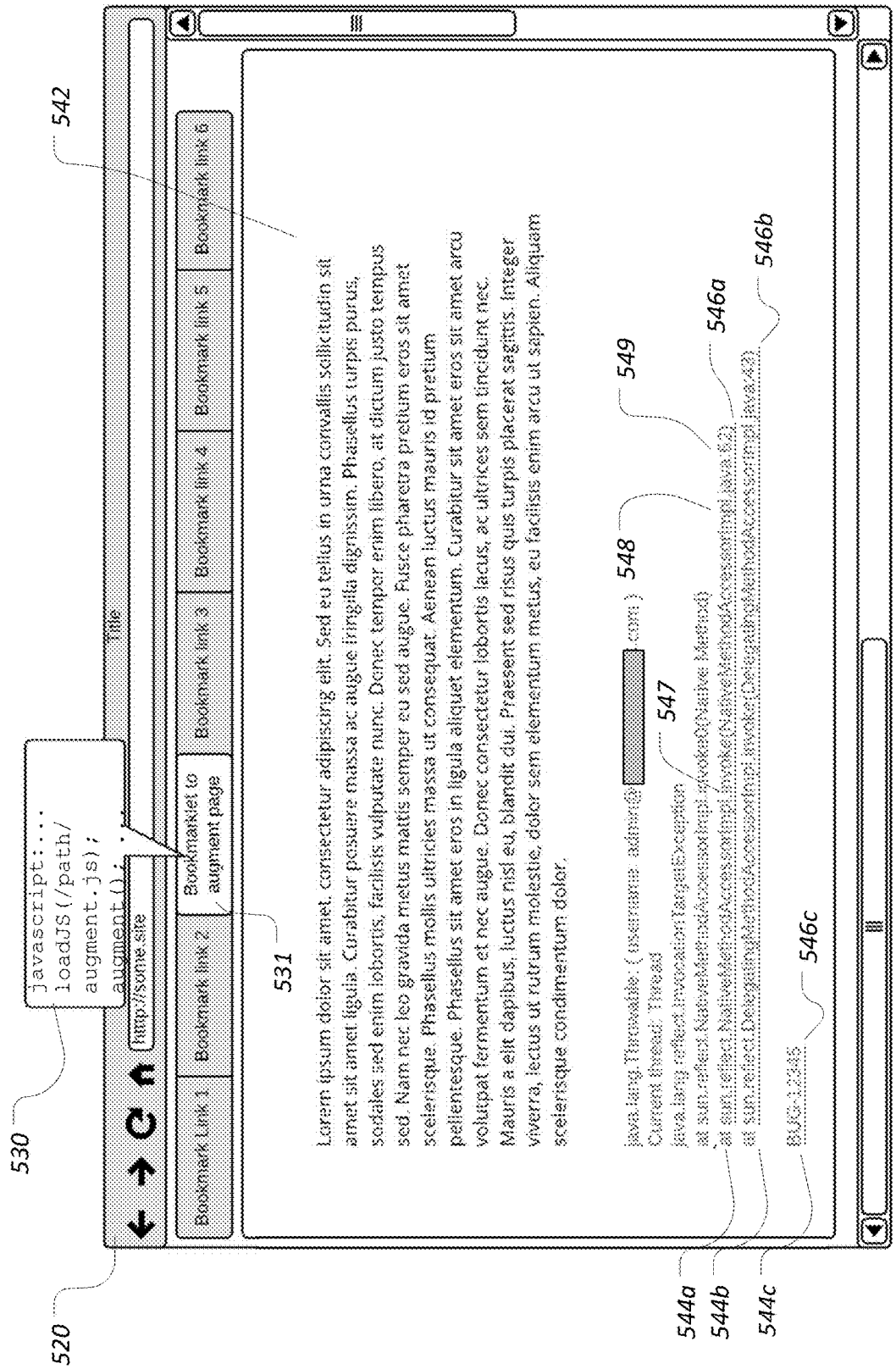
Figure 5C:
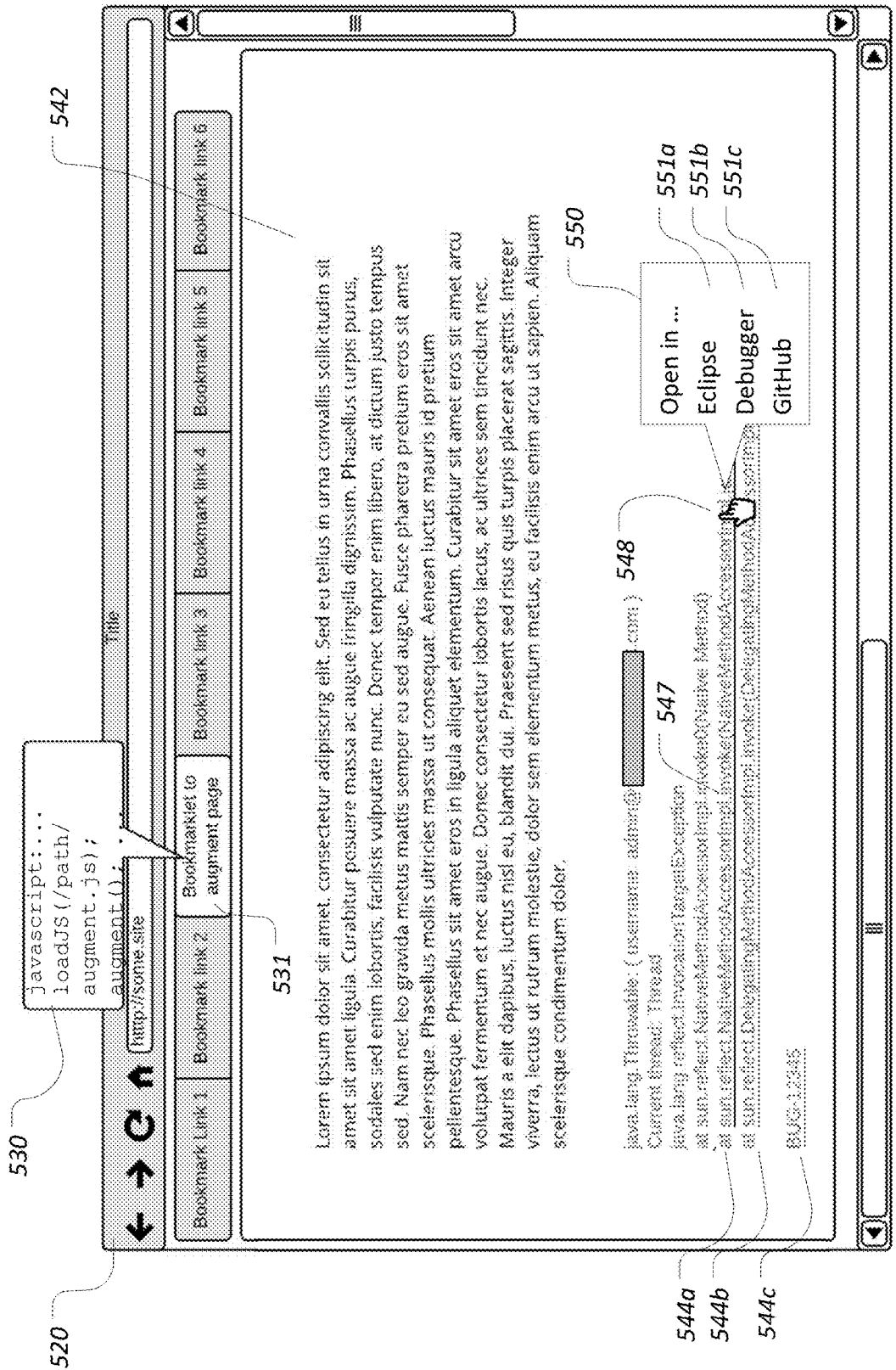

FIGS. 5A-5C illustrate the augmentation of an example web page 540 displayed in a web browser window 520, according to an embodiment. Web page 540 is an example of content 140 and 240, and web browser window 520 is an example of output from a client application 120, according to an embodiment. As with the web browser described above with respect to FIG. 4, the web browser that displays window 520 has been configured to access a content augmentation script through a bookmarklet 530, which may be activated via the displayed content augmentation activation button 531.

Web page 540 is an output of a web application generated by a web server in response to an HTTP request sent to the URL "http://some.site." The web page 540 includes normal text 541a that the web application has been programmed to output under normal operating conditions. The web page 540 further includes debug text 541b that the web application outputs when encountering an error.

The content augmentation script, when activated, parses web page 540, looking for trigger strings that match content augmentation rules. For instance, the content augmentation script may be configured to apply at least a first content augmentation rule that identifies trigger strings that match the pattern "\S(\S+)\((\S+)\:(\d+)\)" and a second content augmentation rule that identifies trigger strings that match the pattern "BUG\-\d+".

Evaluating the first rule, the content augmentation script would identify two trigger strings: 544a-544b. These trigger strings 544 are portions of a stack trace that identify specific lines 547 of specific functions 547 in specific files of code 548 that were being executed at the time that the web application encountered the error. The pattern for the first rule is designed to subdivide the matching trigger string 544a into three subgroups, corresponding to the function 547, file 548, and line number 549, respectively. The content augmentation script is configured to select the subgroup corresponding to file 548 as the target item, and utilize function 547 and/or line number 549 to form a target action for the target item.

Evaluating the second rule, the content augmentation script would identify a final trigger string 544c, which is an identifier of a bug report generated when the web application encountered the error.

Based on these errors, the content augmentation script would generate three links 546, depicted in FIG. 5B. Link 546a is a link designed to open the file 548 ("NativeMethodAccessorimpl.java") in a target development tool (e.g. an client-side or web-based IDE) and either search for the function 547 ("sun.reflect.NativeMethodAccessorImpl.invoke") or scroll to the line number 62, depending on the embodiment. Link 546b is a similar to link 546a, but links to the target context for trigger string 544b instead. Finally, the link 546c is a link to a search application on a bug tracking website for the trigger string 544c (BUG-12345).

In some embodiments, the content augmentation rules may specify multiple target contexts associated with some or all of the trigger strings. FIG. 5C illustrates such an embodiment. Specifically, the trigger string 544b is associated with a first target context in which the file 548 is to be opened in a client-side IDE known as Eclipse and scrolled to the line 549, a second target context in which the file 548 is to be opened in a web-based debugger utility with the line 549 used as a breakpoint, and a third target context in which the online code repository GitHub is to be searched for the function 547. Instead of automatically launching to one of these target contexts immediately upon a user clicking link 546b, the web browser window 520 has instead been configured to display a menu interface 550. The menu interface 550 includes three links 551a, 551b, and 551c, corresponding to the first, second, and third context, respectively. Clicking one of the links 551 causes the web browser to launch the corresponding context.

Of course, a variety of other target contexts may be identified instead, with different target applications, items, and/or actions, depending on the content augmentation rules. Moreover, the menu interface 550 may take any suitable appearance, depending on the embodiment.

Note that, for certain types of triggering elements, such as the depicted triggering elements 544a-b, the location of the target item may be ambiguous just from the intrinsic information within the triggering element. For example, it may not be apparent to a target application which location the file 548 should be read from. In some embodiments, location information, such as a local file system path, web domain, and/or server path, may be hard-coded into the content augmentation rules, or user-configurable. The location information may then be added when generating the associated link. In some embodiments, the content augmentation script may be configured to resolve a location for a file 548, function 547, or other target item based on searching a repository, and then add the location when generating the link. If no suitable location is found, the content augmentation script may determine not to augment the triggering element. In some embodiments, an IDE or IDE plug-in may instead be configured to resolve the item's location based on searching a repository to which the IDE is linked, searching recently opened projects or files, searching currently opened projects, or using any other resolution mechanism.

Of course, the example web page 540 illustrated in FIG. 5 is but one example of content that may be augmented in this manner. Moreover, other rules and trigger conditions may produce the same or different trigger strings within the web page 540, some or all of which may be linked to contexts that involve applications other than development tools.

FIGS. 6A-6B illustrate the augmentation of a stack trace 620 outputted for an example program 610, according to an embodiment. The example program 610 is a Java program comprising four methods 612-618. Method 612 is configured to call method 614, which is configured to call method 616, which is configured to call method 618, which is configured to throw an error. The result of execution of the program 618 is the output of the stack trace 620. Stack trace 620 comprises a separate line 622-628 for each method in the stack frame at the time the error was thrown, and thus each line corresponds to a different one of methods 612-618, in reverse of the order the methods 612-618 are called in program 610.

In FIG. 6A, the stack trace 620 is shown without augmentation, as it might appear conventionally in a console, web page, or log file. In FIG. 6B, the stack trace 620 is shown with augmentation from a content augmentation module configured to parse the output of program 610. Specifically, each line 622-628 of the stack trace has been identified as a separate trigger string, and thus augmented with a link to a corresponding code block. That is to say, line 622 of stack trace 620 is augmented with a link that opens the program 610 in an editor to the method 628, line 624 of stack trace 620 is augmented with a link that opens the program 610 to the method 616, and so forth.

Figure 7:
FIG. 7 is a screenshot illustrating the augmentation of a web page outputted by a testing framework.

FIG. 7 is a screenshot 700 illustrating the augmentation of a web page outputted by a testing framework. A testing error is currently shown, including a stack trace 746 that has automatically been augmented by a content augmentation module so that its various lines link to corresponding code blocks in an editor, code repository, or other development tool.

Figure 8:
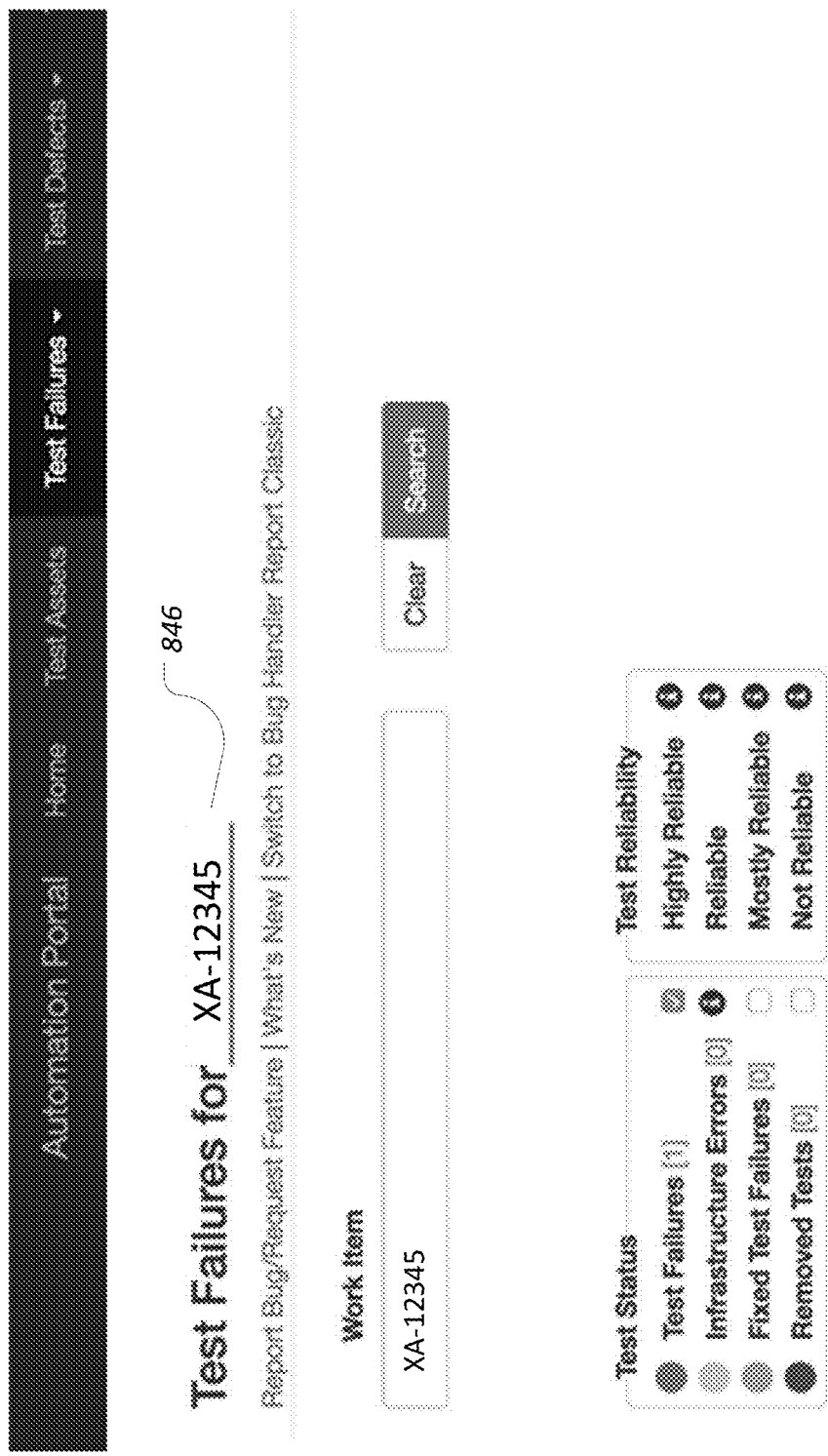
FIG. 8 is another screenshot illustrating the augmentation of a web page outputted by a testing framework.

FIG. 8 is another screenshot 800 illustrating the augmentation of a web page outputted by a testing framework, according to an embodiment. Testing failures associated with a job identified as "XA-12345" are shown. The job identifier has been automatically augmented with a link to a tool to modify the job. Of course, it is entirely possible that the testing framework could itself be enhanced to augment the content of screenshot in this manner 800 before delivery to client. However, with the content augmentation techniques described herein, a user may take the augmentation process into his or her own hands and augment content on the client-side without having to wait for the provider of the testing framework to enhance the testing framework interface in this manner.

Again, FIGS. 6-8 illustrate but several of the many types of content that may be augmented in accordance to the described techniques. Other content may include fewer or different trigger strings, serve different development purposes, or even be entirely unrelated to software development.

4.0. Functional Overview

Figure 9:
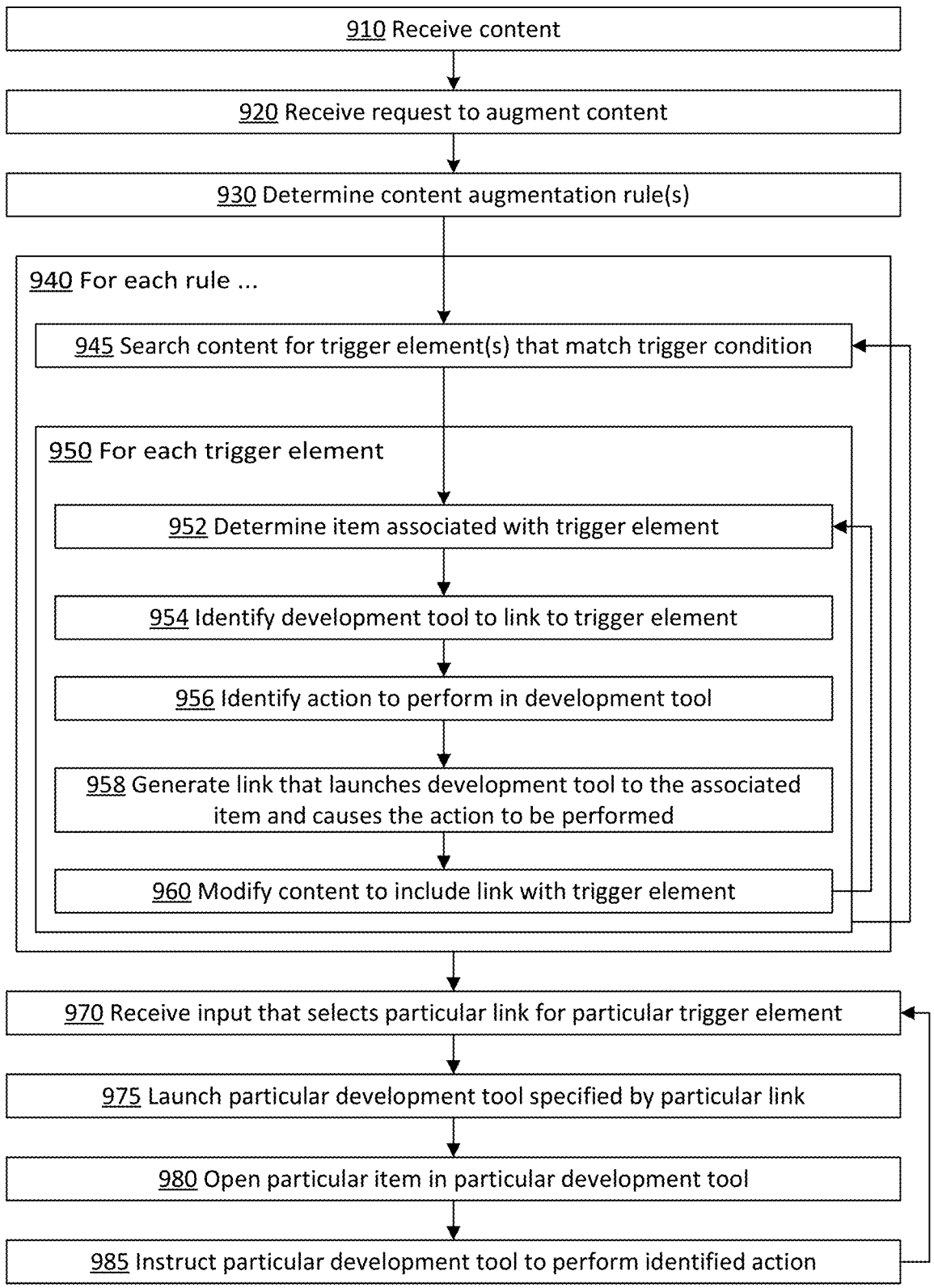
FIG. 9 illustrates an example flow for augmenting content.

FIG. 9 illustrates an example flow 900 for augmenting content, according to an embodiment. The various elements of flow 900 may be performed in a variety of systems, including systems such as systems 100 and 300 described above. However, flow 900 may be performed in other systems as well. Nor should systems 100 or 300 be construed as relying exclusively on flow 900 to provide the features described above.

In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 910 comprises receiving content, such as content 140 or 240. The content is received at a client application executing on a client device, such as client application 120. The content may be received in a variety of manners, such as in response to an HTTP request to a web server, in response to a request to load a file, as output from executing one or more functions of the client application, and so forth.

Block 920 comprises receiving a request to augment the content. The request will generally take the form of some user input, such as in a button or other control of the client application. The button may be, for instance, a button that activates a content augmentation module, such as bookmarklet or menu option. In some embodiments, block 920 may be omitted, and the content augmentation is instead performed automatically upon receiving the content 910.

Block 930 comprises, responsive to the request, determining content augmentation rules for augmenting the content. The augmentation rules may be stored in any suitable location accessible to the client application. Block 930 may comprise, for instance, loading JavaScript or other instructions that implement the rules from a server, loading and interpreting data encoding the rules from a JSON or other data stream, loading the content augmentation rules from a local file, and so forth.

In some embodiments, the content augmentation rules may be specific to a user, client application, web domain, or other attribute related to a context in which the content is being viewed. In such cases, block 930 may comprise, for instance, loading the rules from a source specific to the attribute, sending information identifying the attribute to a server from which the rules are requested, and/or executing logic to filter the content augmentation rules based on the attribute.

Block 940 comprises evaluating the rules to link trigger strings to associated target items. Block 940 comprises a number of blocks 945-960, which are repeated for each of the rules determined in block 930.

Block 945 comprises searching the content for trigger strings that match a trigger condition specified by a particular content augmentation rule. The trigger condition may include, for instance, a pattern to be matched. The trigger condition might further stipulate other aspects of the matching trigger string(s), such as a location within the content to be searched, a number of matches to search for, and so forth. The trigger condition may be specified using any suitable data structure and/or program code.

Generally, searching for the trigger string will comprise parsing the content, typically (though not necessarily) from the beginning of the content, searching for specific text of the content that matches the trigger condition. The matching specific text is known as the trigger string.

Block 950 is then performed with each matching trigger string, if any are found. Block 950 comprises sub-blocks 952-960.

Block 952 comprises determining an item associated with the trigger string. In some cases, the item is the same as the trigger string. For example, the trigger string may be an absolute file name, address, or other unambiguous reference to the item, by which the item is directly retrievable. In other cases, the item is derivable from the trigger string. For instance, the content augmentation rule may include item identification data, which may specify a transformation to apply to the trigger string to derive the associated item. Such a transformation may include one or more insertion and/or substitution operations specified by the rule. In yet other cases, the item may be derivable via a specified function or mapping operation.

Block 954 comprises identifying a development tool to link to the trigger string. The development tool may be specified directly by the rule, or may be determined via some mapping logic or function. The development tool may be specified via a reference to a local or cloud-based location at which the development tool may be accessed, such as via a URL. Or, the development tool may be specified via a scheme or protocol, which will later be resolved by the client operating system to the appropriate development tool.

Block 956 comprises identifying an action to perform in the development tool. Block 956 is optional, depending on the embodiment and/or the rule. As with the development tool, the action may be specified directly by the content augmentation rule, or determinable from the trigger string.

Block 958 comprises generating a link that launches the development tool to the associated item and causes the action to be performed. This may comprise, for instance, generating a URI that combines an address, protocol, and/or scheme of the development tool with a reference to the associated item and action, if specified. Or, this may comprise generating one or more JavaScript or other program instructions.

Block 960 comprises modifying the content to include the link with the trigger string. This may comprise, for instance, wrapping the trigger string in a "<a>" markup tag, having an href attribute set to the link. This may also or instead comprise modifying a DOM rendered from the content to similar affect. In yet other embodiments, this may comprise inserting a button or other control next to the trigger string and associating the control with the link. Any other suitable mechanism may also or instead be utilized.

After block 950 is performed for each trigger string identified for the particular rule, another iteration of block 940 may be performed for another rule, until all rules have been evaluated.

In some cases, a trigger string may match trigger conditions for more than one rule, and/or have more than one associated item. In such cases, block 960 may comprise inserting a pop-up menu interface that appears when the trigger string, or an associated control, is clicked on or otherwise activated. All links for the trigger string are then inserted into the menu interface.

After the content has been augmented per block 940, flow 900 then proceeds to block 970, which comprises receiving input that selects a particular link for a particular trigger string in the augmented content. The input is received via content interfacing logic, such as logic configured to receive inputs associated with the augmented content as the augmented in a web browser or other content viewing application. For instance, a user may click or otherwise activate the trigger string, or a control associated therewith. This may activate the link immediately, or the user may be presented one or more menus from which the particular link may be selected, depending on the embodiment and the number of rules that the trigger string matched.

Responsive to the particular link being selected, in block 975, the content viewing application launches the particular development tool specified by the particular link. Depending on the tool, this may comprise launching the executable for a local development IDE or other application, or launching a web browser tab or window to a specific URL at which a remote IDE or other development application is accessed.

Block 980 comprise opening the particular item in the particular development tool. The particular development tool may be instructed to open the particular item in the same call that launched the development tool (e.g. as a command line argument, a query string parameter, etc.), or the link may cause the content viewing application to subsequently instruct the development tool to open the item. In some embodiments, the link may instruct a plug-in to open the particular item, which in turn instructs the development tool to do so.

Similarly, block 985 comprises instructing the particular development tool to perform the identified action. Again, this may occur at the same time the tool is launched, or via a subsequent instruction.

Blocks 970-985 may be repeated any number of times with respect to any number of trigger strings and/or associated items in the content.

Flow 900 is but one example of a flow for augmenting content according to the techniques describe herein. Other flows may include fewer, additional, or different elements in varying arrangements.

5.0. Example Embodiments

Examples of some embodiments are represented, without limitation, in the following clauses:

According to an embodiment, a method comprises: searching textual content for trigger strings that match trigger conditions specified by content augmentation rules, the content augmentation rules including two or more content augmentation rules that target different development tools; selecting a particular trigger string that matches a particular trigger condition specified by a particular content augmentation rule; modifying the textual content to link the particular trigger string to a particular development tool indicated by the particular content augmentation rule, the link specifying a particular item that is determined based upon the particular trigger string; responsive to input selecting the particular trigger string, launching the particular development tool based upon the particular item.

In an embodiment, the textual content is a web page, the method further comprising instructing a web browser that requested the web page to perform the searching, selecting, and modifying.

In an embodiment, the method further comprises storing instructions for implementing the method at least partially in a bookmarklet, extension, or plug-in installed to the web browser; wherein at least the modifying is responsive to user input activating the bookmarklet, extension, or plug-in.

In an embodiment, the textual content includes a stack trace; wherein the particular trigger string includes a file name and a line number in the stack trace; wherein the particular item is a file having the file name; wherein launching the particular development tool based upon the particular item comprises opening the file in a code editor to the line number.

In an embodiment, the particular content augmentation rule includes: a pattern that the particular trigger string matches; an insertion or substitution rule by which the particular item is determinable from the particular trigger string; and a Uniform Resource Locator for the particular development tool.

In an embodiment, modifying the textual content to link the particular trigger string to the particular development tool comprises: modifying the textual content to include a menu activated by selection of the particular trigger string, wherein the menu includes two or more links that link the particular trigger string to different development tools.

In an embodiment, launching the particular development tool based upon the particular item comprises instructing the particular development tool to search for the particular item.

In an embodiment, launching the particular development tool based upon the particular item comprises instructing the particular development tool to perform a particular action with respect to the particular item once the particular item is opened in the particular development tool, the particular action indicated by the particular content augmentation rule.

In an embodiment, the particular development tool is, or is a component of, a client-side Integrated Development Environment; wherein launching the particular development tool based upon the particular item comprises sending one or more instructions to a plug-in installed to the Integrated Development Environment, the plug-in configured to cause the Integrated Development Environment to perform the particular action.

In an embodiment, the particular development tool is one of: a bug database, a testing framework, a versioning control system, or a debugger.

In an embodiment, one or more non-transitory computer-readable media store instructions that, when executed by one or more computer devices, cause performance of the foregoing methods. In an embodiment, the instructions are stored in the form or one or more JavaScript files that are executed by a web browser in which the content is displayed.

According to an embodiment, an apparatus comprises: one or more communication interfaces configured to receive textual content sent by a web server to one or more client devices; a content augmentation subsystem configured to: search the textual content for trigger strings that match trigger conditions specified by content augmentation rules, the content augmentation rules including two or more content augmentation rules that target different development tools; select a particular trigger string that matches a particular trigger condition specified by a particular content augmentation rule; and modifying the textual content to link the particular trigger string to a particular development tool indicated by the particular content augmentation rule, the link specifying a particular item that is determined based upon the particular trigger string, the link configured to, responsive to input selecting the particular trigger string, launch the particular development tool based upon the particular item; wherein the one or more communication interfaces are further configured to send the modified textual content to the one or more client devices.

According to an embodiment, a method comprises: searching textual content for trigger strings that match trigger conditions specified by content augmentation rules, the content augmentation rules including two or more content augmentation rules that target different development tools; selecting a particular trigger string that matches a particular trigger condition specified by a particular content augmentation rule; and modifying the textual content to link the particular trigger string to a particular development tool indicated by the particular content augmentation rule, the link specifying a particular item that is determined based upon the particular trigger string, the link configured to, responsive to input selecting the particular trigger string, launch the particular development tool based upon the particular item.

According to an embodiment, an apparatus comprises a parser configured to: search textual content for trigger strings that match trigger conditions specified by content augmentation rules, the content augmentation rules including two or more content augmentation rules that target different development tools; and select a particular trigger string that matches a particular trigger condition specified by a particular content augmentation rule; link insertion logic configured to modify the textual content to link the particular trigger string to a particular development tool indicated by the particular content augmentation rule, the link specifying a particular item that is determined based upon the particular trigger string; and content interfacing logic configured to, responsive to input selecting the particular trigger string, launching the particular development tool based upon the particular item.

Other examples of these and other embodiments are found throughout this disclosure.

6.0. Implementation Mechanism—Hardware Overview

Figure 10:
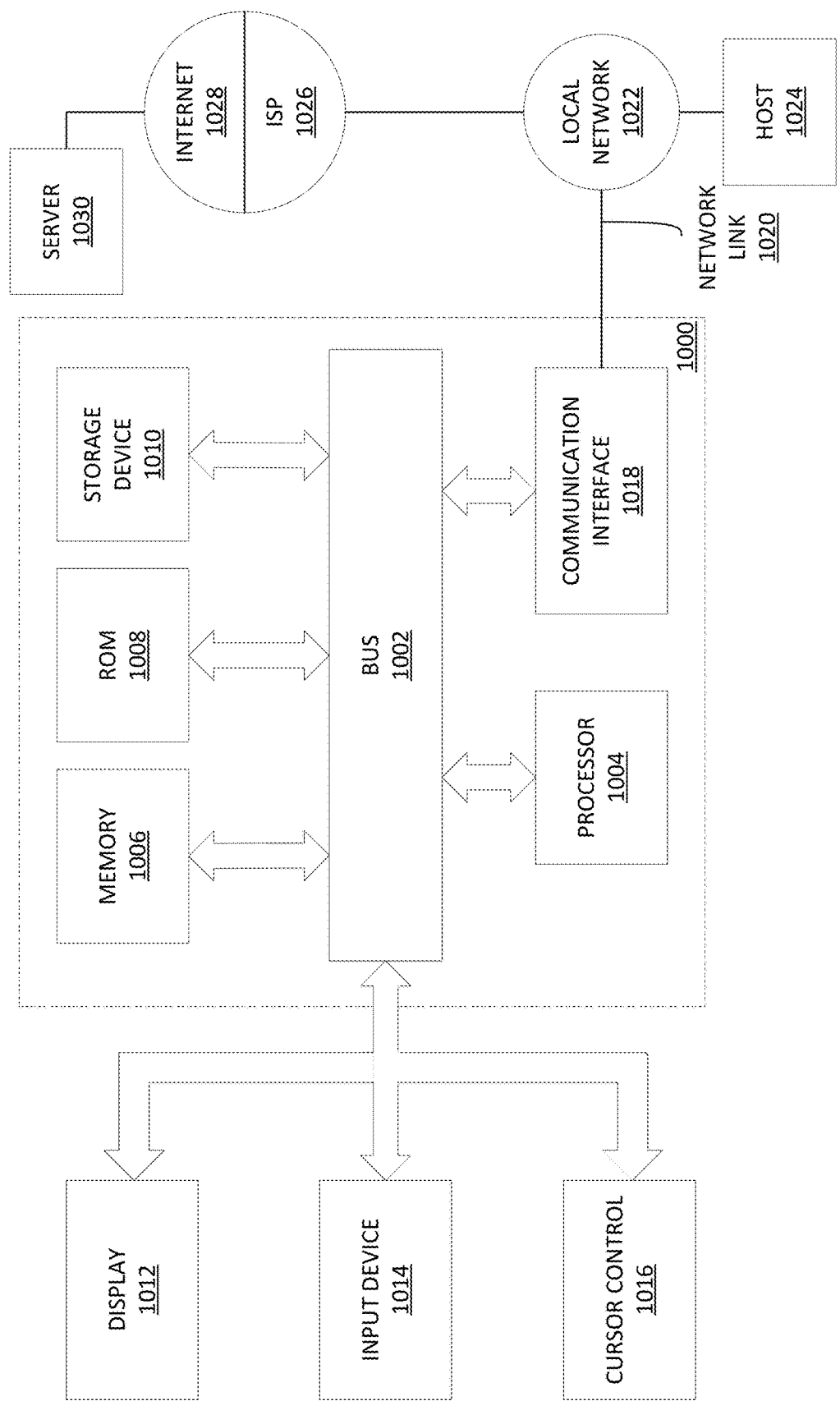
FIG. 10 is block diagram of a computer system upon which embodiments of the inventive subject matter may be implemented.

FIG. 10 is a block diagram that illustrates a computer system 1000 utilized in implementing the above-described techniques, according to an embodiment. Computer system 1000 may be, for example, a desktop computing device, laptop computing device, tablet, smartphone, server appliance, computing mainframe, multimedia device, handheld device, networking apparatus, or any other suitable device.

Computer system 1000 includes one or more busses 1002 or other communication mechanism for communicating information, and one or more hardware processors 1004 coupled with busses 1002 for processing information. Hardware processors 1004 may be, for example, a general purpose microprocessor. Busses 1002 may include various internal and/or external components, including, without limitation, internal processor or memory busses, a Serial ATA bus, a PCI Express bus, a Universal Serial Bus, a HyperTransport bus, an InfiniBand bus, and/or any other suitable wired or wireless communication channel.

Computer system 1000 also includes a main memory 1006, such as a random access memory (RAM) or other dynamic or volatile storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes one or more read only memories (ROM) 1008 or other static storage devices coupled to bus 1002 for storing static information and instructions for processor 1004. One or more storage devices 1010, such as a solid-state drive (SSD), magnetic disk, optical disk, or other suitable non-volatile storage device, is provided and coupled to bus 1002 for storing information and instructions.

Computer system 1000 may be coupled via bus 1002 to one or more displays 1012 for presenting information to a computer user. For instance, computer system 1000 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1012 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1012.

In an embodiment, output to display 1012 may be accelerated by one or more graphics processing unit (GPUs) in computer system 1000. A GPU may be, for example, a highly parallelized, multi-core floating point processing unit highly optimized to perform computing operations related to the display of graphics data, 3D data, and/or multimedia. In addition to computing image and/or video data directly for output to display 1012, a GPU may also be used to render imagery or other video data off-screen, and read that data back into a program for off-screen image processing with very high performance. Various other computing tasks may be off-loaded from the processor 1004 to the GPU.

One or more input devices 1014 are coupled to bus 1002 for communicating information and command selections to processor 1004. One example of an input device 1014 is a keyboard, including alphanumeric and other keys. Another type of user input device 1014 is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. Yet other examples of suitable input devices 1014 include a touch-screen panel affixed to a display 1012, cameras, microphones, accelerometers, motion detectors, and/or other sensors. In an embodiment, a network-based input device 1014 may be utilized. In such an embodiment, user input and/or other information or commands may be relayed via routers and/or switches on a Local Area Network (LAN) or other suitable shared network, or via a peer-to-peer network, from the input device 1014 to a network link 1020 on the computer system 1000.

A computer system 1000 may implement techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1000 can receive the data on the network and demodulate the signal to decode the transmitted instructions. Appropriate circuitry can then place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

A computer system 1000 may also include, in an embodiment, one or more communication interfaces 1018 coupled to bus 1002. A communication interface 1018 provides a data communication coupling, typically two-way, to a network link 1020 that is connected to a local network 1022. For example, a communication interface 1018 may be an integrated services digital network (ISDN) card, cable modem, satellite modem, or a modem to provide a data communication connection to a corresponding type of telephone line. As another example, the one or more communication interfaces 1018 may include a local area network (LAN) card to provide a data communication connection to a compatible LAN. As yet another example, the one or more communication interfaces 1018 may include a wireless network interface controller, such as a 802.11-based controller, Bluetooth controller, Long Term Evolution (LTE)

modem, and/or other types of wireless interfaces. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by a Service Provider 1026. Service Provider 1026, which may for example be an Internet Service Provider (ISP), in turn provides data communication services through a wide area network, such as the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

In an embodiment, computer system 1000 can send messages and receive data, including program code and/or other types of instructions, through the network(s), network link 1020, and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. As another example, information received via a network link 1020 may be interpreted and/or processed by a software component of the computer system 1000, such as a web browser, application, or server, which in turn issues instructions based thereon to a processor 1004, possibly via an operating system and/or other intermediate layers of software components.

In an embodiment, some or all of the systems described herein may be or comprise server computer systems, including one or more computer systems 1000 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media storing instructions that, when executed by one or more computing devices, cause:
   receiving, by a content augmentation module within a browser at a client, an instruction to augment a web page requested by the browser;
   responsive to receiving the instruction, the content augmentation module searching text in the web page for textual trigger strings that match trigger conditions specified by content augmentation rules;
   selecting, by the content augmentation module, a particular trigger string that matches a particular trigger condition specified by a particular content augmentation rule of the content augmentation rules, the particular trigger string being a reference to a block of code that appears within a stack trace or within an error message, the particular trigger string includes a file name and a line number, the stack trace or the error message appears in the text on the web page;

modifying, by the content augmentation module, the web page to embed the particular trigger string in a link configured to launch a user interface for a development tool indicated by the particular content augmentation rule, the link further specifying a file having the file name that includes or is associated with the block of code and the line number;

responsive to user input to the browser that selects the link from the modified web page, opening the file to the line number in the user interface of the development tool as specified by the link.

2. The one or more non-transitory computer-readable media of claim 1, wherein the content augmentation module is a bookmarklet, extension, or plug-in installed to the web browser;

wherein one or more of receiving the instruction or performing the modifying is responsive to user input activating the bookmarklet, extension, or plug-in.

3. The one or more non-transitory computer-readable media of claim 1, wherein the instructions, when executed by one or more computing devices, further cause loading the particular content augmentation rule from a server, wherein the particular content augmentation rule includes:

a pattern that the particular trigger string matches;

an insertion or substitution rule by which the file is determinable from the particular trigger string; and a Uniform Resource Locator for the development tool.

4. The one or more non-transitory computer-readable media of claim 1, wherein the link is linked to a menu activated by selection of the particular trigger string, wherein the menu includes two or more menu items that link the particular trigger string to different development tools.

5. The one or more non-transitory computer-readable media of claim 1, wherein the instructions, when executed by the one or more computing devices, are further configured to cause:

the content augmentation module instructing the development tool to search for references to the file, the opening of the user interface based upon a result of the searching.

6. The one or more non-transitory computer-readable media of claim 1, wherein the development tool is, or is a component of, a client-side Integrated Development Environment;

wherein opening the user interface comprises sending one or more instructions to a plug-in installed to the Integrated Development Environment, the plug-in configured to cause the Integrated Development Environment to perform a particular action indicated by the particular content augmentation rule with respect to the file once the file is opened in the Integrated Development Environment.

7. The one or more non-transitory computer-readable media of claim 1, wherein the development tool is one of: a bug database, a testing framework, a versioning control system, or a debugger.

8. A method comprising:

receiving, by a content augmentation module within a browser at a client, an instruction to augment a web page requested by the browser;

responsive to receiving the instruction, the content augmentation module searching text in the web page for textual trigger strings that match trigger conditions specified by content augmentation rules;

selecting, by the content augmentation module, a particular trigger string that matches a particular trigger condition specified by a particular content augmentation rule of the content augmentation rules, the particular trigger string being a reference to a block of code that appears within a stack trace or within an error message, the particular trigger string includes a file name and a line number, the stack trace or the error message appears in the text on the web page;

modifying, by the content augmentation module, the web page to embed the particular trigger string in a link configured to launch a user interface for a development tool indicated by the particular content augmentation rule, the link further specifying a file having the file name that includes or is associated with the block of code and the line number;

responsive to user input to the browser that selects the link from the modified web page, opening the file to the line number in the user interface of the development tool as specified by the link.

9. The method of claim 8, wherein the content augmentation module is a bookmarklet, extension, or plug-in installed to the web browser;

wherein one or more of receiving the instruction or performing the modifying is responsive to user input activating the bookmarklet, extension, or plug-in.

10. The method of claim 8, further comprising loading the particular content augmentation rule from a server, wherein the particular content augmentation rule includes:

a pattern that the particular trigger string matches;

an insertion or substitution rule by which the file is determinable from the particular trigger string; and a Uniform Resource Locator for the development tool.

11. The method of claim 8, wherein the link is linked to a menu activated by selection of the particular trigger string, wherein the menu includes two or more menu items that link the particular trigger string to different development tools.

12. The method of claim 8, further comprising:

the content augmentation module instructing the development tool to search for references to the file, the opening of the user interface based upon a result of the searching.

13. The method of claim 8, wherein the development tool is, or is a component of, a client-side Integrated Development Environment;

wherein opening the user interface comprises sending one or more instructions to a plug-in installed to the Integrated Development Environment, the plug-in configured to cause the Integrated Development Environment to perform a particular action indicated by the particular content augmentation rule with respect to the file once the file is opened in the Integrated Development Environment.

14. The method of claim 8, further comprising:

the content augmentation module determining that the web page was received from a specific source;

the content augmentation module generating the instruction to augment the web page responsive to the determining.

15. The method of claim 8, wherein the web page was generated by a web application, wherein the stack trace or error message indicates an error that occurred when the web application generated the web page, wherein the block of code is part of a function, class, object, or structure that was being implemented when the error occurred, wherein opening the block of code comprises the browser requesting a new web page comprising the user interface, in which the block of code is editable.

16. An apparatus comprising:
one or more processors;
a content augmentation module, implemented by the one or more processors, configured to receive an instruction to augment a web page requested by a browser, the content augmentation module further comprising:
a parser, configured to:
responsive to receiving the instruction, search text on the web page for textual trigger strings that match trigger conditions specified by content augmentation rules; and
select a particular trigger string that matches a particular trigger condition specified by a particular content augmentation rule, the particular trigger string being a reference to a block of code that appears within a stack trace or within an error message, the particular trigger string includes a file name and a line number, the stack trace or the error message appears in the text on the web page; and
link insertion logic configured to modify the web page to embed the particular trigger string in a link configured to launch a user interface for a development tool indicated by the particular content augmentation rule, the link further specifying a file having the file name that includes or is associated with the block of code and the line number;
content interfacing logic, implemented by one or more processors, configured to, responsive to user input to the browser that selects the link from the modified web page, open the file to the line number in the user interface of the development tool as specified by the link.

17. The one or more non-transitory computer-readable media of claim 1, wherein the instructions, when executed by the one or more computing devices, are further configured to cause:
the content augmentation module determining that the web page was received from a specific source;
the content augmentation module generating the instruction to augment the web page responsive to the determining.

18. The one or more non-transitory computer-readable media of claim 1, wherein the web page was generated by a web application, wherein the stack trace or error message indicates an error that occurred when the web application generated the web page, wherein the block of code is part of a function, class, object, or structure that was being implemented when the error occurred, wherein opening the block of code comprises the browser requesting a new web page comprising the user interface, in which the block of code is editable.

* * * * *